US012763080B2

(12) United States Patent
Bishop et al.

(10) Patent No.: US 12,763,080 B2
(45) Date of Patent: Oct. 13, 2026

(54) SYSTEM AND METHOD FOR DETECTING DEEP FAKE AUDIO

(71) Applicant: Bank of America Corporation, Charlotte, NC (US)

(72) Inventors: Jack Bishop, Evanston, IL (US); Jason C. Starin, Huntersville, NC (US); Carrie E. Gates, Las Vegas, NV (US)

(73) Assignee: Bank of America Corporation, Charlotte, NC (US)

( * ) Notice: Subject to any disclaimer, the term of this patent is extended or adjusted under 35 U.S.C. 154(b) by 120 days.

(21) Appl. No.: 18/786,830

(22) Filed: Jul. 29, 2024

(65) Prior Publication Data

US 2026/0031090 A1 Jan. 29, 2026

(51) Int. Cl.
*G10L 17/12* (2013.01)
*G10L 21/0216* (2013.01)

(52) U.S. Cl.
CPC .......... *G10L 17/12* (2013.01); *G10L 21/0216* (2013.01); *G10L 2021/02168* (2013.01)

(58) Field of Classification Search
CPC ................. G10L 17/12; G10L 21/0216; G10L 2021/02168
See application file for complete search history.

(56) References Cited

U.S. PATENT DOCUMENTS 8,510,109 B2 * 8/2013 Terrell .................... G10L 15/01 704/235
8,732,017 B2 * 5/2014 Attenberg .......... G06Q 30/0241 705/14.6
9,571,652 B1 * 2/2017 Zeppenfeld ........... H04L 9/3231
11,514,342 B2 11/2022 Yocam
11,862,177 B2 1/2024 Chen et al.
12,131,750 B1 * 10/2024 Rodriguez .............. G10L 25/51
12,525,224 B2 * 1/2026 Altaf ....................... G10L 15/08
2004/0210443 A1 * 10/2004 Kuhn ...................... G10L 15/22 704/E15.04

(Continued)

OTHER PUBLICATIONS

J. Zhang, Z. Liu, p. Liu and B. Wu, "Dual-Waveform Emotion Recognition Model for Conversations," 2021 IEEE International Conference on Multimedia and Expo (ICME), Shenzhen, China, 2021, pp. 1-6, doi: 10.1109/ICME51207.2021.9428327.

(Continued)

*Primary Examiner* — Anne L Thomas-Homescu

(57) ABSTRACT

A system for analyzing audio includes a memory configured to store known digital audio representation containing known fraudulent audio streams and a processor operably coupled to the memory. The processor receives a portion of an audio stream from an external device and produces a transcript of the portion of the audio stream. The processor then determines a timing score, an emotional score, a background score, and a content score by analyzing the portion of an audio stream and the corresponding transcript and comparing them to the known digital audio representations and transcripts. The processor then determines if the audio stream is malicious by combining the timing score, emotional score, background score, and content score to produce a combined score and comparing the combined score to a threshold. The processor notifies a user that the call may be fraudulent when the combined score is greater than the threshold.

20 Claims, 3 Drawing Sheets

(56) References Cited

U.S. PATENT DOCUMENTS

| | | | | |
|---|---|---|---|---|
| 2009/0055175 | A1* | 2/2009 | Terrell | G10L 15/26 704/235 |
| 2012/0253805 | A1* | 10/2012 | Rajakumar | G10L 17/26 704/E15.001 |
| 2012/0254243 | A1* | 10/2012 | Zeppenfeld | G06Q 20/4016 707/778 |
| 2014/0136194 | A1* | 5/2014 | Warford | G10L 25/51 704/233 |
| 2014/0380488 | A1 | 12/2014 | Datta Ray et al. | |
| 2015/0195406 | A1* | 7/2015 | Dwyer | G06F 40/30 379/265.07 |
| 2017/0214702 | A1* | 7/2017 | Moscovici | H04W 12/106 |
| 2018/0032612 | A1* | 2/2018 | Kariman | G06F 16/433 |
| 2018/0174587 | A1* | 6/2018 | Bermundo | G06F 3/1271 |
| 2019/0020482 | A1* | 1/2019 | Gupta | H04L 9/3231 |
| 2019/0156191 | A1* | 5/2019 | Cordes | G08B 31/00 |
| 2019/0179861 | A1 | 6/2019 | Goldenstein et al. | |
| 2020/0404019 | A1 | 12/2020 | Drake | |
| 2020/0404094 | A1* | 12/2020 | Roderick | H04M 3/42221 |
| 2021/0019339 | A1* | 1/2021 | Ghulati | G06F 16/353 |
| 2021/0097382 | A1* | 4/2021 | Mathews | G06N 3/045 |
| 2021/0174487 | A1* | 6/2021 | Nießner | G06V 10/431 |
| 2021/0184915 | A1* | 6/2021 | Fenoglio | H04L 43/04 |
| 2021/0233541 | A1* | 7/2021 | Chen | G10L 17/22 |
| 2021/0406719 | A1* | 12/2021 | Yocam | G06N 5/04 |
| 2022/0028396 | A1* | 1/2022 | Li | G10L 25/78 |
| 2022/0121868 | A1* | 4/2022 | Chen | G10L 17/22 |
| 2022/0269922 | A1* | 8/2022 | Mathews | G06N 3/0464 |
| 2022/0335947 | A1* | 10/2022 | Li | G10L 15/28 |
| 2023/0013385 | A1* | 1/2023 | Kitagishi | G06N 20/00 |
| 2023/0136553 | A1* | 5/2023 | Olwal | G06V 40/70 704/235 |
| 2023/0262160 | A1* | 8/2023 | Trivedi | H04M 3/42102 704/251 |
| 2023/0385893 | A1* | 11/2023 | Rohatgi | G10L 17/06 |
| 2024/0040035 | A1* | 2/2024 | Dropuljic | G10L 15/005 |
| 2024/0070458 | A1 | 2/2024 | Charnock et al. | |
| 2024/0275881 | A1* | 8/2024 | Critzer | G10L 25/51 |
| 2024/0347064 | A1* | 10/2024 | Li | G06N 3/045 |
| 2024/0355337 | A1* | 10/2024 | Altaf | G10L 15/02 |
| 2024/0363099 | A1* | 10/2024 | Altaf | G10L 15/02 |
| 2024/0363103 | A1* | 10/2024 | Altaf | G10L 15/08 |
| 2024/0363123 | A1* | 10/2024 | Khoury | G10L 25/60 |
| 2024/0363125 | A1* | 10/2024 | Khoury | G10L 17/08 |
| 2025/0054495 | A1* | 2/2025 | Carbune | G10L 15/22 |

OTHER PUBLICATIONS

Zeynep Hilal Kilimci, et al; "Evaluating raw waveforms with deep learning frameworks for speech emotion recognition;" Dept of Information Systems Engineering, Kocaeli University, Kocaeli, Turkey; arXiv:2307.02820; submitted on Jul. 6, 2023, https://doi.org/10.48550/arXiv.2307.02820.

* cited by examiner

SYSTEM AND METHOD FOR DETECTING DEEP FAKE AUDIO

TECHNICAL FIELD

The present disclosure relates generally to telephony and, more specifically, to a system and method for detecting deep fake audio.

BACKGROUND

Telephones and mobile devices are often used to carry out conversations between people. These conversations may be used to influence people to make crucial decisions. When making important decisions, people rely on being able to correctly identify the person or persons on the other side of the conversation. However, with modern methods and technologies such as deep fakes, bad actors make it increasingly difficult for a person to determine that the person or persons on the other side of the conversation are who they claim to be. Misidentification may result in a person potentially making a determinantal decision.

SUMMARY

The system and method disclosed in the present application provide a technical solution to the technical problems discussed above by analyzing an audio stream, such as a phone call, to determine if a person on an audio stream, such as a phone call, is who they claim/appear to be. By using the system and method disclosed in the present application, a deepfake may be detected in real-time, keeping a user from making a potential mistake that may have dire ramifications. Manipulative calls or other fraudulent audio streams may be detected by performing timing, emotional, background noise, and content analyses. Based on this analysis, a score or probability may be determined and compared to a threshold. If the score or probability is greater than the threshold, the system and method may alert the user in one or more embodiments, possibly preventing a successful fraud.

In one or more embodiments, the disclosed system and method analyze audio to determine if it is potentially from a fraudulent source using technology such as a deep fake. The system includes a memory configured to store known digital audio representations, which comprise two or more portions of fraudulent audio streams. The system also includes a processor operably coupled to the memory.

The processor is configured to receive a portion of an audio stream from an external device and produce a transcript of the portion of the audio stream. The processor determines scores related to timing, emotions, background noise, and content. The processor may determine the timing score by analyzing the timing of the portion of the audio stream by determining the length of pauses between syllables in the portion of the audio stream. The processor may determine the emotional score by analyzing the emotional content of the portion of the audio stream by analyzing the portion of the audio stream to determine which words are emphasized in the portion of the audio stream. The background score may be determined by analyzing the audio stream to detect the background noise and comparing the detected background noise to the known background noise contained in the known digital audio representations. The content score may be determined by comparing the transcript to known digital audio representations.

The processor determines the scores in one or more embodiments by comparing the audio stream and corresponding transcript to the content of the known digital audio representations. The timing, emotional content, background noise, and content scores are combined into a combined score, which is compared with a threshold. The user is then notified when that score is greater than the threshold.

The disclosed system provides several practical applications, such as detecting if a phone call or other audio-based communication is a deepfake in real time. The system and method also allow for a user to be quickly alerted when a deepfake is detected so that they may take appropriate action. Further, the system and method may change as threats evolve or are changed, so the system and method are not limited to detecting a specific type of attack. By utilizing the disclosed system and method, fewer computational resources are needed that may detect and adjust in real-time to threats, making audio-based communications safer and more reliable.

Certain embodiments of the present disclosure may include some, all, or none of these advantages. These advantages and other features will be more clearly understood from the following drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System, Overview

Figure 1:
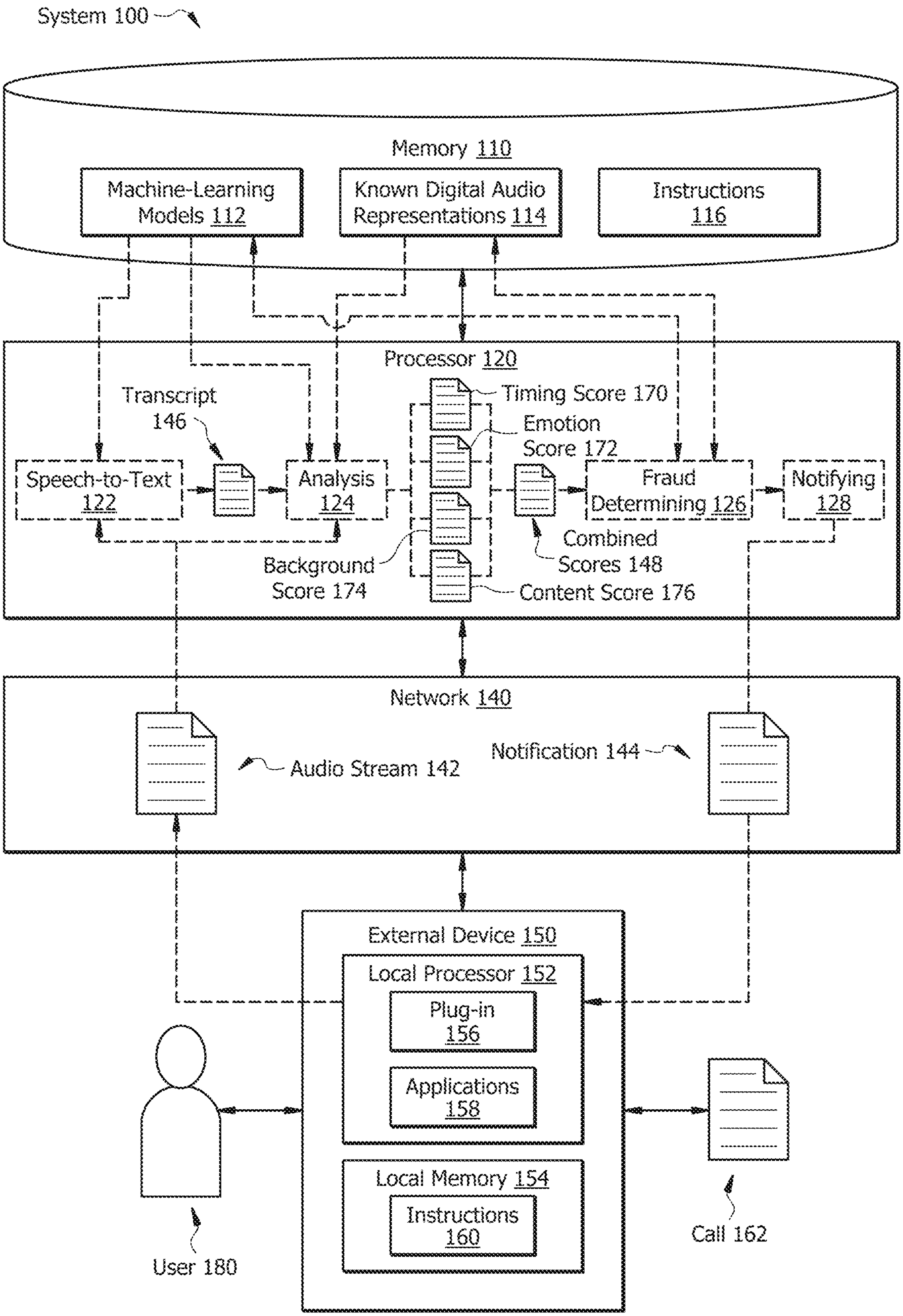
FIG. 1 illustrates one embodiment of a system configured for detecting deep fake audio.

FIG. 1 is a schematic diagram of a system 100 configured for analyzing an audio stream 142 to determine if one or more parties on the audio stream 142 are the result of a deepfake. A processor 120 receives the audio stream 142 from an external device 150 and provides feedback to a user 180 of the external device 150. The external device 150 in one or more embodiments is a mobile phone or similar device used by a user 180. The system 100 in one or more embodiments includes the external device 150, network 140, processor 120, and memory 110. The system 100 may be configured as shown or in any other suitable configuration.

External Device

In one or more embodiments, the system 100 includes an external device 150. The external device 150 is used by the user 180 when listing or interacting with an audio stream 142, such as an audio stream 142 produced during a phone call 162. The phone call 162 in one or more embodiments is an unexpected call received by the user 180 using the external device 150. The external device 150 may include a processor 152 and a memory 154. Examples of an external device 150 may include, but are not limited to, computers, laptops, mobile devices (e.g., smartphones or tablets), servers, clients, automated teller machines (ATM), point of sale devices (POS), or any other suitable type of devices that may be used for communicating an audio stream 142 to a user 180 and through network 140 to a processor 120 for analysis. The external device 150 may also support one or more applications 158, including those related to or producing the audio stream 142, such as voice over the internet, video conferencing, and/or interacting with a telephonic infrastructure through the network 140 or other means. While only one external device 150 is shown, in one or more embodiments, a plurality of external devices, e.g., 150, each interacting with one or more users, e.g., 170, may be present, and the disclosure is not limited to a single external device 150 and/or a single user 180.

The external device 150 includes at least one local processor 152 that performs one or more processes or operations, including performing applications 158, an optional plug-in 156, and receiving notification 144 and audio stream 142 and sending and receiving these to the local processor 120 and user 180. The local processor 152 executes instructions 160 stored in the local memory 154 to perform the application 158 as well as send and receive the audio stream 142 and notification 144. The application 158 may include video conferencing, voice over internet (VOIP), messaging, web pages, database applications, banking applications, word processing applications, entertainment applications, video applications, and/or any other applications that a user 180 may need the external device 150 to host.

When executing the application 158, the local processor 152 may perform various operations. The local processor 152 may make API calls, perform batch jobs, modify application data (not shown) stored in local memory 154, and modify application data stored in other external devices (not shown). The local processor 152 may also perform one or more mathematical and logical operations, start and/or maintain active threads, and send and/or receive information through the network 140 to the processor 120 or another external device 150. The local processor 152 may perform other operations not listed above without departing from the disclosure; those listed are provided only as examples.

The external device 150 may include a local memory 154 for storing instructions 160 that are for performing the applications 158 and sending and/or producing the audio stream 142 and notification 144. The local memory 154 may also store application information (not shown) and information (not shown) related to the plug-in 156 and/or the audio stream 142. The local memory 154 may be any type of storage for storing instructions 160 for executing by the local processor 152. The local memory 154 may be a non-transitory computer-readable medium in operative communication with the local processor 152. The local memory 154 may be one or more disks, tape drives, or solid-state drives. Alternatively, or in addition, the local memory 154 may be one or more cloud storage devices. The local memory 154 may be volatile or non-volatile. It may comprise read-only memory (ROM), random-access memory (RAM), ternary content-addressable memory (TCAM), dynamic random-access memory (DRAM), and static random-access memory (SRAM).

While FIG. 1 shows the external device 150, including only a single local processor 152 and a local memory 154, it may include any suitable number and combination of processors, e.g., 152 and memories, e.g., 154, as well as any other necessary components. For simplicity, only one local processor, e.g., 150, and one local memory, e.g., 154, are shown in FIG. 1.

Network

The network 140 may be any suitable type of wireless and/or wired network including, but not limited to, all or a portion of the Internet, an intranet, a private network, a public network, a peer-to-peer network, the public switched telephone network or telco network, a cellular network, a local area network (LAN), a metropolitan area network (MAN), a wide area network (WAN), and a satellite network. The network 140 may be configured to support any suitable type of communication protocol as would be appreciated by one of ordinary skill in the art.

The network 140 may connect the external device 150 with the processor 120 and memory 110. Alternatively, network 140 may connect the external device 150 through the Internet or other large networks. In one or more embodiments, different elements of system 100 may be at different geographic locations and connected through network 140. While shown as a single network 140, the network 140 may comprise a plurality of components of any suitable networking equipment, including but not limited to routers and switches, that allow at least the external device 150 to communicate with the processor 120 and/or memory 110. Network 140 is not limited to the configuration shown in FIG. 1, which is simply shown in this form for simplicity and explanatory purposes.

Memory

Memory 110 may be any type of storage for storing a computer program comprising instructions 116, machine learning models 112, and known digital audio representations 114. The memory 110 may be a non-transitory computer-readable medium in operative communication with the processor 120. The memory 110 may be one or more disks, tape drives, or solid-state drives. Alternatively, or in addition, the memory 110 may be one or more cloud storage devices. The memory 110 may be volatile or non-volatile. It may comprise read-only memory (ROM), random-access memory (RAM), ternary content-addressable memory (TCAM), dynamic random-access memory (DRAM), and static random-access memory (SRAM).

The memory 110 stores instructions 116, which, when executed by the processor 120, causes the processor 120 to perform the operations shown in FIGS. 2 and 3 described below. Instructions 116 may comprise any suitable set of instructions, logic, rules, or code. Memory 110 may include storage that may take the form of a database for storing things such as known digital audio representations 114. These may be stored and recalled using known protocols such as SQL, XML, and/or any other protocol or language that a user, administrator, or developer of the system 100 wishes to use. The instructions 116, known as digital audio representations 114, and any other information stored in memory 110 may be stored in different forms, and the disclosure is not limited to storing the instructions 116, known as digital audio representations 114, and machine learning models 112 as a database.

In one or more embodiments, the memory 110 stores machine learning models 112. The machine learning model 112 may be trained or untrained models needed for the processor 120 to perform analysis 124 and fraud determination 126. The machine learning modules may be trained on and/or used to analyze and produce a timing score 170, emotional score 172, background score 174, and content score 176 of the audio stream 142. The machine learning modules in one or more embodiments may take the form of generative artificial intelligence (GenAI). The machine learning modules may use supervised learning, unsupervised learning, reinforcement learning, or any other type of learning. In one or more embodiments, the machine learning model 112 may include modules that allow for the performance of logistic regression when the processor 120 determines weights for a combined score of 148, as will be described below and with regards to FIGS. 2 and 3. Other machine learning models 112 as well as any artificial intelligence AI models needed for performing the method and processes described below with regards to FIGS. 2 and 3.

In one or more embodiments, the memory 110 also stores known digital audio representations 114. These audio representations may be recordings made of conversations with customer service or maybe recordings made of known people speaking, for example, a politician, or they may be previous audio streams, e.g., 142, that had been captured. In one or more embodiments, at least some of the known digital audio representations 114 may be labeled as being fraudulent. For example, recordings of known "Grandfather" scams may have been previously recorded by law enforcement and/or by other users. Other scams or fraudulent audio streams may also be recorded and stored as known digital audio representations 114. The known digital audio representations 114 may be updated with new recordings as audio streams 142 are analyzed by the processor 120 and/or from other sources that have recording and/or the text/transcripts of other scams, including any new scams that become known. The known digital audio representations 114 may include both audio streams, e.g., 142, and transcripts for known conversations. Any other information may be stored in memory 110, along with the known digital audio representations 114 and/or machine learning models 112, without departing from the disclosure.

Processor

The processor 120 may take the form of any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 120 may be a programmable logic device, a microcontroller, a microprocessor, or any suitable combination of the preceding. The processor 120 is communicatively coupled to and in signal communication with the memory 110. One or more processors make up the processor 120 and are configured to process data, which may be implemented in hardware or software. For example, the processor 120 may be 8-bit, 16-bit, 32-bit, 64-bit, or of any other suitable architecture. The processor 120 may include an arithmetic logic unit (ALU) for performing arithmetic and logic operations, processor registers that supply operands to the ALU and store the results of ALU operations, and a control unit that fetches instructions 116 from memory 110 and executes them by directing the coordinated operations of the ALU, registers and other components.

The processor 120 is in operative communication with memory 110 and configured to implement various instructions 116 stored in memory 110. The processor 120 may be a special-purpose computer designed to implement the instructions 116 and/or functions disclosed herein. For example, the processor 120 may be configured to perform operations, including those described below and shown in FIGS. 2 and 3. The processor 120 may perform speech-to-text 122, analysis 124, fraud determining 126, and notifying 128. One or more of the operations may use the machine learning model 112 and known digital audio representations 114 stored in the memory 110. The processor 120 may perform more or less operations than shown in FIGS. 2 and 3; the specific operations shown are only examples.

While a single processor 120 is shown, the processor 120 may include a plurality of processors or computational devices. The operations, e.g., speech-to-text 122, analysis 124, fraud determining 126, and notifying 128, described herein as being performed by the processor 120 may be performed by a separate processor 120 or software application executed on a single computational device, e.g., processor 120, or they may be located on separate servers, separate datacenters such as a cloud server and/or one or more of the external devices 150.

In one or more embodiments, the processor 120 receives one or more audio streams 142 from an external device 150 via network 140. The audio stream 142 is received in real-time and comprises real-time audio that is analyzed while user 180 is still participating in the call 162. The audio stream 142 is analyzed by the processor 120 performing speech-to-text 122 to produce a transcript 146. The processor also performs analysis 124 on the audio stream 142 as well as the transcript 146 produced when performing speech-to-text 122.

The analysis 124 produces a plurality of scores such as, but not limited to, a timing score 170, an emotional score 172, a background score 174, and a content score 176 as will be described in more detail with respect to FIGS. 2 and 3. The scores in one or more embodiments are the probability that the audio stream 142 is fraudulent and may be represented as a percentage or a ranking. These scores are then combined to produce a combined score 148. When combining the plurality of scores to create a combined score 148, in one or more embodiments, each score is given a predetermined weight. The predetermined weight may be produced using one or more machine learning models 112; for example, logistic regression may be used to determine which scores are most important or relevant for detecting a particular type of fraud or for use in a particular situation. For example, different weights may be applied when the audio stream 142 is supposedly from a family member, where a background score 174 and emotional score 172 may receive more weight versus a call 162 from an alleged customer service representative of a company where a content score 176 may receive more weight.

Based on the analysis 124, the processor 120, using the combined score 148, performs fraud determining 126. In fraud determining 126, the processor 120 compares the combined scores 148 with a predetermined threshold. In one or more embodiments, the predetermined threshold is based on the type of audio stream 142 and/or based on other criteria. For example, in a nonlimiting example, for an audio stream 142 that is allegedly from a customer service representative, the threshold may be relatively low, whereas, for an audio stream 142 from an alleged call 162 from a family member, it may have a higher threshold. The threshold may be any predetermined number, and it may change as the nature of threats changes and the quality of the deep fakes and other types of fraud evolves.

In one or more embodiments, the processor 120, after determining if the audio stream 142 is fraudulent, performs notifying 128. When performing notifying 128, the processor sends a notification 144 through the network 140 to the external device 150. The notification may cause the local processor 152 to cause the external device 150 to emit an audio tone or alert the user with a text or other indicia. The notification, for example, may cause the external device 150, when receiving the notification 144, to vibrate or provide some other form of haptic feedback. In another example, the external device 150 may add an audio message that is only audible to user 180, alerting or notifying user 180 that the call 162 may be fraudulent.

Process for Determining if a Phone Call is a Deep Fake

Figure 2:
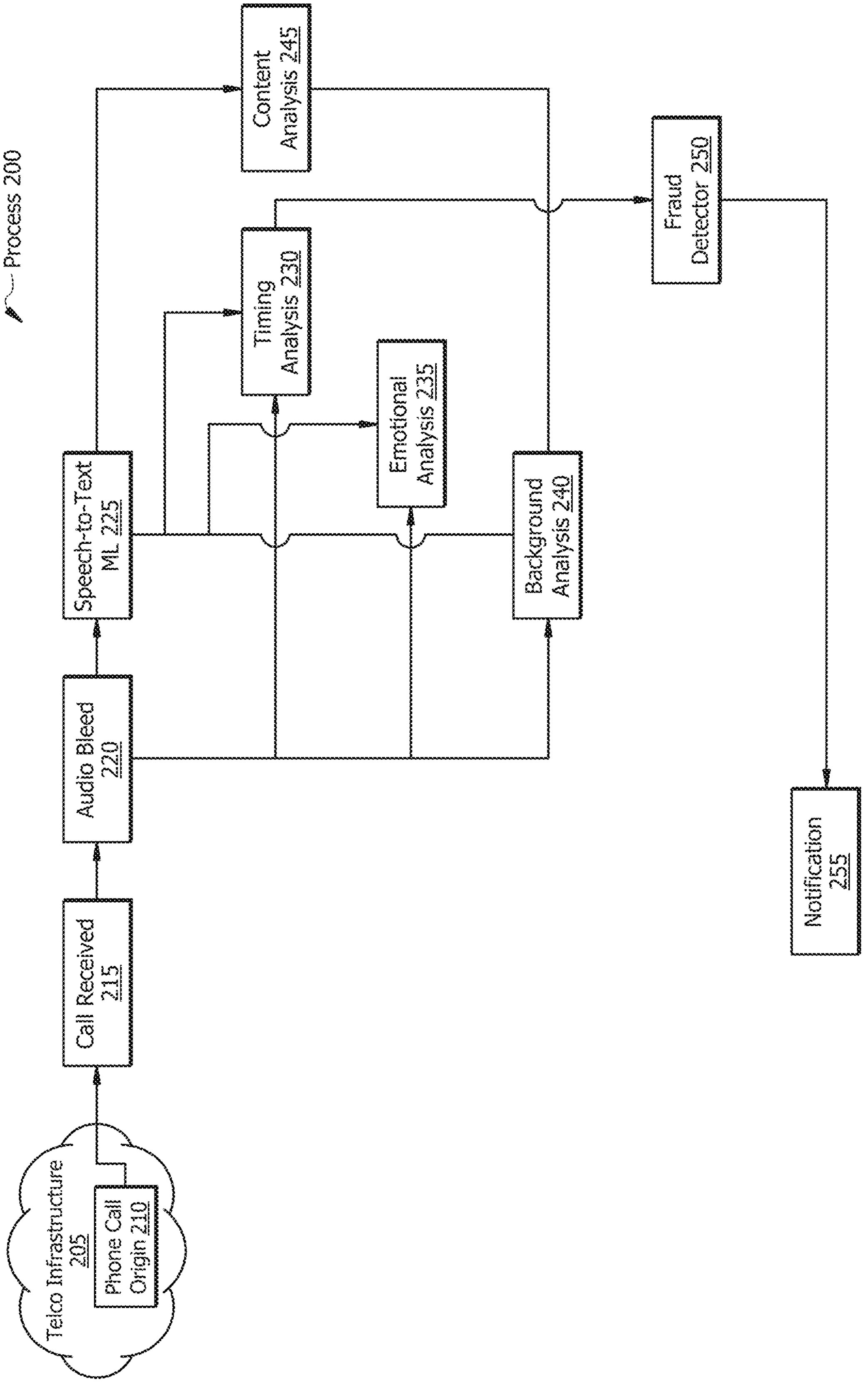
FIG. 2 illustrates one embodiment of a process for determining if a phone call includes deep fake audio.

FIG. 2 is a diagram of an exemplary process 200 for a processor 120 to analyze 124, an audio stream 142 received from an external device 150, and/or a telco infrastructure 205. In one or more embodiments, the audio stream 142 may have its origin 210 at another location connected to the external device 150 using a telco infrastructure 205. The telco infrastructure 205 may take the form of a cellular network or a land-based telephone network, or alternatively, the phone call 162 origin may be over the Internet or another network 140. The phone call 162 in one or more embodiments is an unexpected call received by the user 180 using the external device 150. Alternatively, the user 180 may indicate to the external device 150 that they want a particular call, e.g., 162, analyzed, and other calls, e.g., 162, are not analyzed.

In one or more embodiments, the call 162 is received at 215, and the audio is bled at 220 to extract an audio stream 142 from the call 162. In one or more embodiments, the call 162 is received at 215 by the external device 150 and/or a plug-in 156 installed on the external device 150. The external device 150 and/or the plug-in 156 perform an audio bleed 220 to extract the audio stream 142, which is then forwarded over the network 140 to the processor 120. Alternatively, the processor 120 may directly receive the call 162 and perform an audio bleed 220. The audio bleed 220 may be performed using any conventional means. The resulting audio stream 142 may take any form and include uncompressed formats such as a WAV file, lossless compression such as MPEG-4, and those with lossy compression MP3. The methods of performing the audio bleed 220 and the form of the audio stream are merely exemplary, and they may take any form without departing from the disclosure.

The processor 120 may take the resulting audio stream 142 and perform speech-to-text 225 to generate a transcript 146. In one or more embodiments, the speech-to-text 225 is performed using machine learning. Techniques for performing speech-to-text may include, for example, the hidden Markov model, including linear regression, neural networks such as long short-term memory (LSTM), and other machine learning methods. Once a transcript is generated when performing speech-to-text 225, the processor 120 begins performing analysis 124 on the resulting transcript 146 and the audio stream 142.

The processor 120 may perform various types of analysis 124 on the audio stream 142 and/or transcript 146. Some of the types of analysis 124 are timing analysis 230, emotional analysis 235, background analysis 240, and content analysis 245. The processor 120 may perform more or less types of analysis on the audio stream 142, and the disclosure is not limited to those just listed. In one or more embodiments, each type of analysis or one or more types of analysis are performed using one or more machine learning models 112 retrieved from memory 110. These modules may be trained on known digital audio representations 114 and may be continuously updated using audio streams 142 obtained from one or more external devices 150.

In one or more embodiments, the processor 120 performs timing analysis 230. When performing timing analysis 230, the processor 120 analyzes the length of pauses between words and/or the speed of individual syllables. This may be done using one or more machine learning models trained on known deepfakes. In one or more embodiments, the determined timing may be compared to known digital audio representation 114 of the same speaker; for example, if the audio stream 142 is allegedly another user, e.g., 170 of system 100, there may be recordings of audio streams 142 that they participated in. Additionally, or instead, the processor 120 may compare the timing with that of known deep fakes or other recordings. Based on the difference between the timing of the audio stream 142 and the expected timing for the same or similar speaker in the known digital audio representations 114, the processor 120 may produce a probability and/or a score that indicates the likelihood that the audio stream 142 includes a deep fake or other deception.

In one or more embodiments, the processor 120 uses the transcript 146 to provide context for the timing analysis. For example, the timing between words and/or syllables may be very different when someone says “I love you” romantically versus “I love you” in an emergency situation. Further, people from different cultures or regions may use different timings, which may be detected by the processor 120. If the timing is different than what is expected for a particular speaker or if it is too uniform, such as the space between the same syllables being the same within a microsecond or less. The processor 120 may indicate a higher probability that the audio stream 142 is fraudulent.

The processor 120 may also, or alternatively, perform emotional analysis 235. When the processor 120 performs emotional analysis 235, in one or more embodiments, it determines where the accents or emphasis are placed in a particular phrase from the audio stream 142, using the transcript 146 to determine where a specific phrase ends or for determining the context of the audio stream 142 and where emphasis should normally be placed. Humans are not milliseconds precise in how they accent or emphasize things. As an example, a machine or deep fake would say, “Honey, my car broke down,” very differently than a human wife. A real human may be panicked, but they would not necessarily be panicked about everything. Using the previous example, a human may emphasize “honey” more than “my car broke down.”

In one or more embodiments, the processor 120 may use machine learning models 112 to analyze the audio stream 142 and determine an emotional score 172. A machine learning model 112 trained on known digital audio representations 114 may detect subtle changes in the emotional content of the audio stream that indicate possible tampering or that the audio stream is being produced artificially by a machine. The processor 120 may also perform sentence diagramming and other techniques to determine how a particular phrase, sentence, or paragraph contained in the audio stream 142 should be emphasized.

The processor 120, when performing emotional analysis 235, may also identify where manipulative words are being used by comparing the words as indicated in the transcript 146 with known manipulative words. While one or two manipulative words may not indicate a potential fraud, when the processor 120 detects more than a threshold in a particular paragraph of the audio stream 142, this may indicate that the audio stream is fraudulent. The manipulative words may be stored in the memory along with the known digital audio representations 114 or stored elsewhere in databases manipulative or social engineering word lists hosted on devices connected through the network 140.

The processor 120 may also, or alternatively, perform background analysis 240 on the audio stream 142. The processor 120 may use the transcript 146 to identify the spoken parts of the audio stream 142. Once identified, the processor 120 may remove the speech or spoken parts from the audio stream 142 using the transcript 146 and analyze the remaining parts of the audio stream 142 for background noise. Alternatively, the spoken parts may not be removed, or the spoken parts may be removed by any method without departing from the disclosure.

When performing background analysis 240, the processor 120 determines if the background noise in the audio stream 142 is consistent with a real environment or appropriate environment. The processor 120 may determine if the background is appropriate given the context of the audio stream 142; for example, in a non-limiting example, if the call 162 is allegedly from the side of the highway, normal vehicle sounds should be present. The processor 120 may also determine if the background noise is repetitive in nature; for example, if the same car horn repeats periodically or if an identical engine sound is heard periodically, this is an indication that the background is being spoofed and the audio stream 142 is potentially fraudulent.

In one or more embodiments, the processor 120 may also analyze sounds that are not audible to humans but are present in real audio streams 142. The processor 120 may be able to detect the sound that human saliva makes when it pops. Human saliva pops periodically, emitting a high-pitch signal; while this occurs periodically, it does not occur on a repeating pattern that is accurate to the millisecond. In one or more embodiments, the processor 120 analyzes the frequency of the saliva noises or pops to determine if they are machine-produced or actual (human) saliva noises or pops.

The background analysis 240, in one or more embodiments, may be performed using machine learning. After removing the speech, the processor 120 may analyze the background noises using one or more machine learning models 112 trained on real audio recordings of various environments and spoofed recordings. As deep fakes and other types of fraud become more sophisticated, the machine learning models 112 may be updated.

The processor 120 may also analyze the content of the audio stream 142 and compare it to the content of known digital audio representations 114 that correspond to malicious audio streams. The processor 120 uses the transcript 146 to determine if it is a known script. For example, if the transcript follows the script of a grandfather scam, even with some minor changes, the processor 120 would indicate a probability that the content of the audio stream 142 is fraudulent. The processor 120 may also determine that the probability is high that the audio stream 142 is fraudulent when it uses certain phrases that would be unusual given the context of the audio stream 142. For example, in a non-limiting example, it would be unusual when a parent is discussing a child's social media post to ask for a large sum of money suddenly.

Once the processor 120 performs timing analysis 230, emotional analysis 235, background analysis 240, content analysis 245, and any other analysis not described or shown but found to be useful, the resulting percentages or scores are combined to produce the combined score 148. In one or more embodiments, each score is given a particular weight based on analysis of previous audio streams 142 and/or known digital audio representations 114. For example, in a non-limiting example, it might be found that timing analysis 230 and background analysis 240 are highly accurate in detecting fraudulent calls, while emotional analysis 235 and content analysis 245 have more false positives. In this case, the timing analysis 230 and background analysis 240 may be given more weight than the emotional analysis 235 and content analysis 245. Other combinations of weights may be used without departing from the disclosure. Emphasizing the background analysis 240 and timing analysis 230 is just an example.

In one or more embodiments, the weights are pre-determined by a user or an administrator. Alternatively, the weights may be determined by the processor 120 performing machine learning to analyze the known digital audio representations 114. The processor 120 may use logistic regression to determine the best weights given the current known or common threats. Additionally, once the processor analyzes a particular audio stream 142, it may use the results of this analysis to update the weights as well as any machine learning models 112 that may be used to perform the timing analysis 230, emotional analysis 235, background analysis 240, and content analysis 245.

Once a combined score 148 is determined, the processor 120 performs fraud detecting 250. When performing fraud detecting 250, the processor 120 compares the combined score 148 to a threshold score. The threshold score may be determined based on any criteria a user, administrator, security official, government official, or other concerned entity selects. Alternatively, or additionally, the threshold score may be determined by using machine learning analysis of the known digital audio representations 114. If the combined score 148 is greater than the threshold, then a notification 255 is sent to the user 180 and/or external device 150.

Flowchart for Determining if Audio is a Deep Fake

Figure 3:
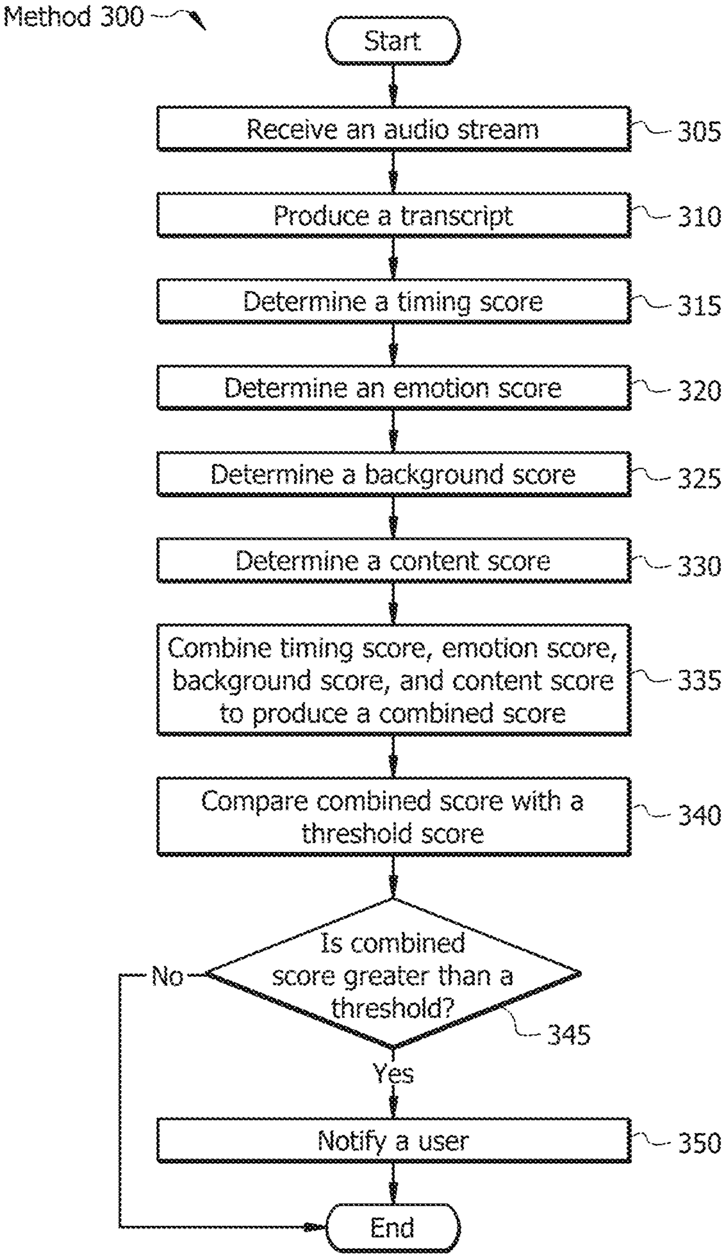
FIG. 3 illustrates one embodiment of a flowchart for detecting deepfake audio.

FIG. 3 is a flowchart of an embodiment of method 300 performed by a processor 120 for determining if an audio stream 142, such as a phone call 162, is a deepfake. The processor 120 may execute instructions 116 stored in the memory 110, which employs method 300 for determining if audio is fraudulent.

Method 300 begins at operation 305 when the processor 120 receives an audio stream 142 from an external device 150. The audio stream 142 may take any form and may be raw audio or compressed audio. The processor 120 takes the audio stream 142 and produces a transcript 146 in operation 310. The processor 120 uses the resulting audio stream 142 and transcript 146 to perform analysis 124 and determine if the audio stream received in operation 305 is fraudulent or manipulative.

Once the processor receives the audio stream in operation 305 and produces a transcript in operation 310, the processor 120 determines a timing score 170 in operation 315. Based on the difference between the timing of the audio stream 142 and the expected timing for the same or similar speaker in the known digital audio representations 114, the processor 120 may determine the timing score 170 in operation 305, which is a probability and/or a score that indicates the likelihood that the audio stream 142 includes a deep fake or other deception. The processor 120 analyzes the length of pauses between words and/or the speed of individual syllables as well as any other timing that has been found to be useful in determining if an audio stream 142 has been artificially created and/or is fraudulent in nature. This may be done using one or more machine learning models trained on known deepfakes. In one or more embodiments, the determined timing may be compared to known digital audio representation 114 of the same speaker; for example, if the audio stream 142 is allegedly another user, e.g., 170 of system 100, there may be recordings of audio streams 142 that they participated in. Additionally, or instead, the processor 120 may compare the timing with that of known deep fakes or other recordings.

Once the processor 120 determines a timing score 170 in operation 315 or at the same time, the processor 120 determines an emotional score 172 in operation 320. When the processor 120 performs emotional analysis 235, in one or more embodiments, it determines where the accents or emphasis are placed in a particular phrase from the audio stream 142, using the transcript 146 to determine where a particular phrase ends or for determining the context of the audio stream 142 and where emphasis should normally be placed. In one or more embodiments, the processor 120 may use machine learning models 112 to analyze the audio stream 142 and determine an emotional score 172. The processor 120 may instead or additionally compare the audio stream 142 with known digital audio representation 114 to see if the emphasis matches patterns found in fraudulent known digital audio representations 114. The processor 120, through the use of machine learning models 112 or other methods, then determines a probability and/or score that the audio stream 142 is fraudulent based on its emotional content.

Once the processor 120 determines both a timing score 170 in operation 315 and an emotional score 172 in operation 320 or at the same time, the processor 120 determines a background score 174 in operation 325. The processor 120 may use the transcript 146 to identify the spoken parts of the audio stream 142. Once identified, the processor 120 may remove the speech from the audio stream 142 and analyze the remaining parts of the audio stream 142 for background noise. Alternatively, the spoken parts may not be removed, or the spoken parts may be removed by any method without departing from the disclosure. When performing background analysis 240, the processor 120 determines if the background noise in the audio stream 142 is consistent with a real environment or appropriate environment. The processor 120 may determine if the background is appropriate given the context of the audio stream 142; for example, in a non-limiting example, if the call 162 is allegedly from the side of the highway, normal vehicle sounds should be present. The processor 120 may also determine if the background noise is repetitive in nature; for example, if the same car horn repeats periodically or if an identical engine sound is heard periodically, this is an indication that the background is being spoofed and the audio stream 142 is potentially fraudulent. The results of the background analysis 240 are then used by the processor 120 to produce a probability or score that audio stream 142 is fraudulent based on the background noise.

Once the processor 120 determines a timing score 170 in operation 315, an emotional score 172 in operation 320, and background score 174 in operation 325, or at the same time, the processor 120 determines a content score 176 in operation 330. When determining a content score 176 in operation 330, the processor 120 may also analyze the content of the audio stream 142 and compare it to the content of known digital audio representations 114 that correspond to malicious audio streams. The processor 120 uses the transcript 146 to determine if it is a known script. For example, if the transcript follows the script of a grandfather scam, even with some minor changes, the processor 120 would indicate a probability that the content of the audio stream 142 is fraudulent. The processor 120 may also determine that the probability is high that the audio stream 142 is fraudulent when it uses certain phrases that would be unusual given the context of the audio stream 142. Based on the analysis of the content of the transcript 146 and/or audio stream 142, the processor 120 determines the content score 176 in operation 330.

Once the timing score 170, emotional score 172, background score 174, and content score 176 are determined in operations 315-330, the processor 120 combines the score to produce a combined score in operation 335. The combined score may simply be the sum of the individual scores, or in one or more embodiments, each of the scores is given a different predetermined weight. As discussed previously, this predetermined weight is determined based on an analysis of known digital audio representations 114 and/or provided by a user, administrator, or other concerned party. Once a combined score is determined in operation 335, that combined score is compared in operation 340 with a threshold score that is similarly determined by a user, administrator, or other concerned party. A determination is made by the processor 120, and if the value of the combined score is greater than a threshold in operation 345, the method 300 proceeds to operation 350, and the user is notified 350 that the audio stream may be malevolent, manipulative, and/or fraudulent. Otherwise, the method 300 of FIG. 3 ends after operation 345.

The present examples are to be considered illustrative and not restrictive, and the intention is not to be limited to the details given herein. For example, the various elements or components may be combined or integrated into another system, or certain features may be omitted or not implemented.

While several embodiments have been provided in the present disclosure, it should be understood that the disclosed systems and methods might be embodied in many other specific forms without departing from the spirit or scope of the present disclosure. The present examples are to be considered illustrative and not restrictive, and the intention is not to be limited to the details given herein. For example, the various elements or components may be combined or integrated into another system, or certain features may be omitted or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To aid the Patent Office and any readers of any patent issued on this application in interpreting the claims appended hereto, applicants note that they do not intend any of the appended claims to invoke 35 U.S.C. § 140(f) as it exists on the date of filing hereof unless the words "means for" or "operation for" are explicitly used in the particular claim.

The invention claimed is:

1. A system for analyzing audio, comprising:

a memory configured to store known digital audio representations, wherein the known digital audio representations comprise two or more portions of fraudulent audio streams; and a processor operably coupled to the memory and configured to:

receive a portion of an audio stream from an external device;

generate a transcript of the portion of the audio stream by utilizing a long short-term memory (LSTM) neural network;

determine a timing score by analyzing a timing of the portion of the audio stream and comparing it to labeled timing of the known digital audio representations, wherein analyzing the timing comprises determining a length of pauses between syllables in the portion of the audio stream;

determine an emotional score by analyzing an emotional content of the portion of the audio stream and comparing it to labeled emotional content of the known digital audio representations, wherein the emotional content is determined at least by analyzing the portion of the audio stream to determine which words are emphasized in the portion of the audio stream;

identify speech from the transcript of the portion of the audio stream, wherein the audio stream comprises a first portion and a second portion and wherein the first portion comprises the speech and the second portion comprises background noise that is repetitive in nature;

remove the first portion from the portion of the audio stream;

in response to removing the first portion from the portion of the audio stream, determine a background score by analyzing the second portion of the audio stream to detect the background noise and comparing the detected background noise to known background noise contained in the known digital audio representations;

determine a content score using the transcript by comparing the transcript to transcripts produced for the known digital audio representations;

determine if the audio stream is malicious by combining the timing score, emotional score, background score, and content score to produce a combined score and comparing the combined score to a threshold; and notify a user when the combined score is greater than the threshold.

2. The system of claim 1, wherein the audio stream is received from the external device and comprises real-time audio.

3. The system of claim 2, wherein the external device is a mobile phone, and the audio stream is an unexpected call received by the user.

4. The system of claim 1, wherein the combined score is a weighted score comprising predetermined weights for each of the timing score, emotional score, background score, and content score and wherein the predetermined weights are determined by analyzing the known digital audio representations using machine learning.

5. The system of claim 4, wherein the machine learning utilizes logistic regression to determine a weight to apply to each of the timing score, emotional score, background score, and content score.

6. The system of claim 1, wherein the timing score, emotional score, background score, and content score are indications of a probability that the portion of the audio stream was produced electronically.

7. The system of claim 1, wherein the timing score is further determined by identifying a speaker in the portion of the audio stream and comparing the portion of the audio stream to known recordings of the speaker that is similar to the portion of the audio stream.

8. The system of claim 1, wherein the speech is removed using the transcript to identify the speech.

9. The system of claim 1, wherein the timing score, emotional score, background score, and content score are determined using machine learning to analyze the portion of the audio stream and the transcript.

10. The system of claim 1, wherein the background noise includes saliva noises and the background score is determined at least in part based on a frequency of the saliva noises.

11. A method for communicating:

receiving a portion of an audio stream from an external device;

generating a transcript of the portion of the audio stream by utilizing a long short-term memory (LSTM) neural network;

determining a timing score by analyzing a timing of the portion of the audio stream and comparing it to labeled timing of a known digital audio representations, wherein analyzing the timing comprises determining a length of pauses between syllables in the portion of the audio stream;

determining an emotional score by analyzing an emotional content of the portion of the audio stream and comparing it to labeled emotional content of the known digital audio representations, wherein the emotional content is determined at least by analyzing the portion of the audio stream to determine which words are emphasized in the portion of the audio stream;

identifying speech from the transcript of the portion of the audio stream, wherein the audio stream comprises a first portion and a second portion and wherein the first portion comprises the speech and the second portion comprises background noise that is repetitive in nature;

removing the first portion from the portion of the audio stream;

in response to removing the first portion from the portion of the audio stream, determining a background score by analyzing the second portion of the audio stream to detect the background noise and comparing the detected background noise to known background noise contained in the known digital audio representations;

determining a content score using the transcript by comparing the transcript to transcripts produced for the known digital audio representations;

determining if the audio stream is malicious by combining the timing score, emotional score, background score, and content score to produce a combined score and comparing the combined score to a threshold; and notifying a user when the combined score is greater than the threshold.

12. The method of claim 11, wherein the combined score is a weighted score comprising predetermined weights for each of the timing score, emotional score, background score, and content score and wherein the predetermined weights are determined by analyzing the known digital audio representations using machine learning.

13. The method of claim 12, wherein the machine learning utilizes logistic regression to determine a weight to apply to each of the timing score, emotional score, background score, and content score.

14. The method of claim 11, wherein the timing score, emotional score, background score, and content score are indications of a probability that the portion of the audio stream was produced electronically.

15. The method of claim 11, wherein the speech is removed using the transcript to identify the speech.

16. The method of claim 11, wherein the timing score, emotional score, background score, and content score are determined using machine learning to analyze the portion of the audio stream and the transcript.

17. A non-transitory computer-readable medium storing instructions that, when executed by a processor, cause the processor to:

receive a portion of an audio stream from an external device;

generate a transcript of the portion of the audio stream by utilizing a long short-term memory (LSTM) neural network; determine a timing score by analyzing a timing of the portion of the audio stream and comparing it to labeled timing of a known digital audio representations, wherein analyzing the timing comprises determining a length of pauses between syllables in the portion of the audio stream;

determine an emotional score by analyzing an emotional content of the portion of the audio stream and comparing it to labeled emotional content of the known digital audio representations, wherein the emotional content is determined at least by analyzing the portion of the audio stream to determine which words are emphasized in the portion of the audio stream;

identify speech from the transcript of the portion of the audio stream, wherein the audio stream comprises a first portion and a second portion and wherein the first portion comprises the speech and the second portion comprises background noise that is repetitive in nature;

remove the first portion from the portion of the audio stream;

in response to removing the first portion from the portion of the audio stream, determine a background score by analyzing the second portion of the audio stream to detect the background noise and comparing the detected background noise to known background noise contained in the known digital audio representations;

determine a content score using the transcript by comparing the transcript to transcripts produced for the known digital audio representations;

determine if the audio stream is malicious by combining the timing score, emotional score, background score, and content score to produce a combined score and comparing the combined score to a threshold; and notify a user when the combined score is greater than the threshold.

18. The non-transitory computer-readable medium of claim 17, wherein the combined score is a weighted score comprising predetermined weights for each of the timing score, emotional score, background score, and content score and wherein the predetermined weights are determined by analyzing the known digital audio representations using machine learning.

19. The non-transitory computer-readable medium of claim 17, wherein the timing score, emotional score, background score, and content score are indications of a probability that the portion of the audio stream was produced electronically.

20. The non-transitory computer-readable medium of claim 17, wherein the timing score is further determined by identifying a speaker in the portion of the audio stream and comparing the portion of the audio stream to known recordings of the speaker that is similar to the portion of the audio stream.

* * * * *